United States Patent [19]
Beans et al.

[11] 3,729,739
[45] Apr. 24, 1973

[54] INSTANTANEOUS FREQUENCY DIVERSITY RADAR SYSTEM

[75] Inventors: Allen F. Beans, Ivyland; Alfred M. Edowes, Doylestown; Richard P. Gagliardi, Philadelphia; Edward E. Koos, Hatboro; all of Pa.

[73] Assignee: The United States of America, as represented by the Secretary of the Navy

[22] Filed: July 28, 1966

[21] Appl. No.: 569,010

[52] U.S. Cl..............................................343/17.1 R

[51] Int. Cl................................................G01s 9/02
[58] Field of Search...........................343/17.1, 17.2; 325/141, 143

Primary Examiner—Malcolm F. Hubler
Attorney—G. J. Rubens and Henry Hansen

EXEMPLARY CLAIM

1. An apparatus for generating instantaneous frequency diversity signals comprising:
    means providing pulse modulated signals; and
    means sampling said signals at selected intervals for providing output signals of instantaneous frequency diversity.

9 Claims, 6 Drawing Figures

Patented April 24, 1973
3,729,739
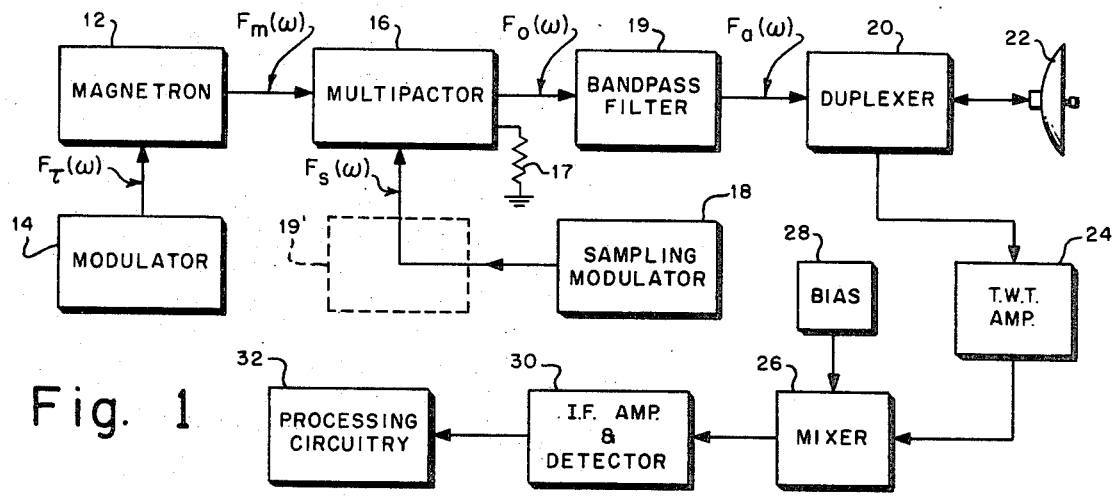
Fig. 1
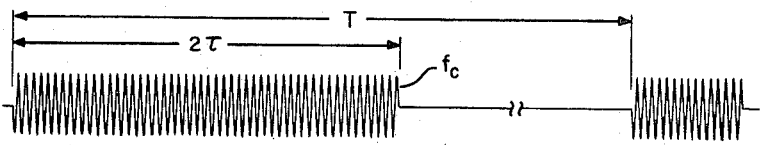
Fig. 2a
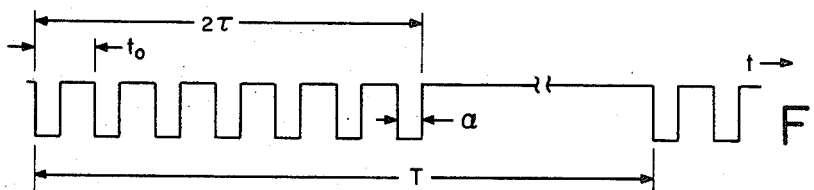
Fig. 2b
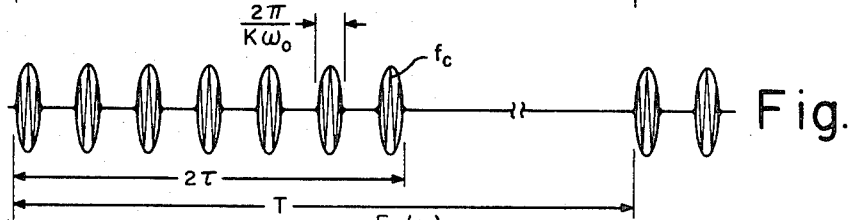
Fig. 2c
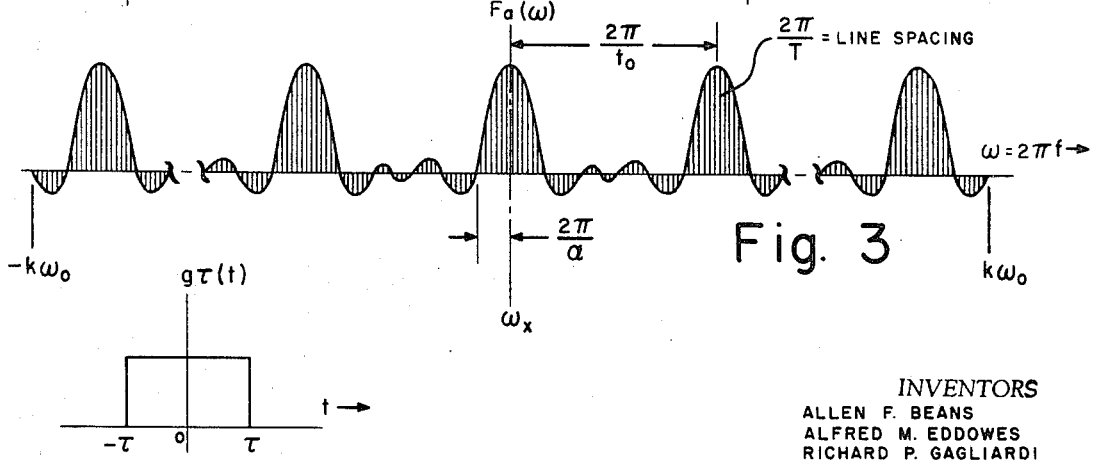
Fig. 3
Fig. 4
INVENTORS
ALLEN F. BEANS
ALFRED M. EDDOWES
RICHARD P. GAGLIARDI
EDWARD E. KOOS
BY
ATTORNEY

INSTANTANEOUS FREQUENCY DIVERSITY RADAR SYSTEM

The invention described herein may be manufactured and used by or for The Government of the United States of America for governmental purposes without the payment of any royalties thereon or therefor.

The present invention relates to radar systems, and more particularly to an instantaneous frequency diversity pulse radar system for providing improved target detection capabilities in the presence of clutter conditions.

Radar systems operating in a ground or turbulent sea background environment produce electromagnetic returns which suffer not only a random amplitude variation as a function of the incident frequency, but also a random phase variation. Both can be attributed to the random nature of the scattering cross section of the complex target. Since the scattering cross section of any target is a function of incident frequency of wavelength (among other things), illuminating the complex target with many frequencies simultaneously will tend to decorrelate the returns from random scatters instantaneously on a single pulse basis. This may be accomplished by processing the return signal through a receiver including a noise-free replica of the transmitted pulse as an input to a broad band mixer operating in its non-linear region, followed by an integrator to realize the cross-correlation function of the optimum receiver.

Attempts at synthesis of a broad band frequency spectrum, although not instantaneous, have been made with one particular type utilizing a single side band generator in a closed loop at X band. This technique attempts to linearly superimpose many frequencies related by a least common multiple to cause beat or interference patterns resulting in a sin $x/x$ amplitude modulated wave. Due to the finite path length of the loop and associated transit time of the loop, however, only narrow frequency bands can be accommodated since the proper phase relationship to cause constructive interference patterns at the right point in time cannot be maintained over wide bands of frequencies. Additionally, this method requires extreme frequency and phase stability in all the components which impose a stringent linearity requirement across the frequency band. Detracting from this method of synthesis is also the requirement for many pieces of complicated test equipment to be used, not only for the initial setup, but also for constant monitoring.

According, the general purpose of the present invention is to overcome the aforementioned disadvantages by periodically sampling a signal in the time domain, which as will be described hereinafter, yields periodic repetition in the frequency domain. The result of this sampling is the creation of an amplitude modulated carrier wave whose envelope (after gating) is in the form of bursts of sine $x/x$ time domain pickets by which the synthesis of a broadband instantaneous frequency spectrum is accomplished.

In accordance with one embodiment of the invention, the carrier frequency of the radar transmitter is modulated at a relatively high pulse repetition rate and then additionally modulated at a low repetition rate, which may for example, be the system repetition rate. As illustrated in Principles of Radar by REINTJES & COATE, 3rd edition, on pages 346 through 349, a pulsed RF signal can be represented by a Fourier series having a frequency spectrum enclosed by a sin $x/x$ envelope. By gating the high frequency pulsed RF signals at the system repetition rate, the RF pulses are further amplitude modulated. The frequency spectrum of this signal is then characterized by a plurality of sin $x/x$ waveforms having a spacing equal to the period of the high frequency repetition rate with the spectral lines occurring at multiples of the low frequency repetition rate. The result of this gating or modulation is to produce an instantaneous frequency spectrum which in the time domain appears as an amplitude modulated carrier wave whose envelope is in the form of bursts. Accordingly, by transmitting such a signal, a target is illuminated with many frequencies simultaneously and the returns from a complex target comprising random scatter will tend to decorrelate instantaneously on a single pulse basis in the receiver whereas returns from a simple target will correlate and produce an output, after integration and detection, which is readily discernible.

In accordance with an additional feature of the present invention, a receiver is utilized which computes the auto correlation of the received signal with itself by employing a mixer operating in the square law region thereby giving the product of the signal with itself. Subsequent narrow banding in the IF and further multiplication in the detector, followed by integration of an "A" scope complete the auto correlation mechanization.

An object of the present invention is therefore the synthesis of a broadband frequency spectrum instantaneously by sampling a signal in the time domain which yields periodic repetition in the frequency domain, the result of which is the creation of an amplitude modulated carrier wave whose envelope is in the form of bursts of sin $x/x$ time pickets.

A further object of the invention is to provide an instantaneous frequency diversity radar system which instantaneously illuminates a target with diverse frequencies and in which echo return signals from complex targets tend to decorrelate instantaneously on a single pulse basis thereby improving the signal to clutter ratio of the system.

Still a further object of the invention is to provide signal to clutter enhancement of target return signals by decorrelating random scatters from a complex target by employing auto correlation techniques.

Other objects and many of the attendant advantages of this invention will be readily appreciated as the same becomes better understood by reference to the following detailed description when considered in connection with the accompanying drawing in which:

FIG. 1 is a block diagram of a radar system employing frequency diversity techniques in transmission and auto correlation techniques in reception;

FIGS. 2a–2c illustrate typical amplitude vs. time waveforms of signals associated with the embodiment of FIG. 1;

FIG. 3 illustrates a typical frequency spectrum of a transmitted signal; and

FIG. 4 shows a step function of unitary amplitude vs. time.

Referring now to the drawing there is shown in FIG. 1 an embodiment of the invention comprising a magnetron 12 being pulsed by a modulator 14 by techniques well known to those skilled in the art. For example, the magnetron may be operating at 9.0 Gc with the modulator 14 pulsing the magnetron at a 2 kc. rate with a 2 microsecond pulse width. The output of the magnetron is illustrated in FIG. 2a as a 2 microsecond burst of RF energy. This signal is applied to a multipactor 16 which may be similar to those illustrated in *The Microwave Journal*, Mar. 1962 at pages 93 through 98, or as illustrated in the Apr. 1962 publication of *Proceedings of the IRE* at pages 442 through 450. The multipactor is essentially a voltage-controlled switch having one input and two output ports, which in the absence of the control voltage, operates as a transmission device to a first output port and a reflecting device to the second port, whereas in the presence of a control voltage, the multipactor is a reflecting device at the first output port and a transmission device at the second output port. The multipactor is capable of power levels greater than 2.5 megawatts with minimum insertion losses and a high degree of isolation to incident power in the reflecting condition.

A sampling modulator 18 is used to provide the control voltage or quenching voltage as it is also referred to, for the multipactor 16 and since the switching times of the multipactor are less than a nanosecond, the output from the magnetron 12 may be modulated or sampled at very high frequencies so as to produce time pickets. For example, if the sampling modulator 18 produces a modulating pulse as illustrated in FIG. 2b, then the non-reflecting output port of the multipactor 16 will be a series of RF pickets with an envelope similar to that illustrated in FIG. 2c comprising a carrier frequency, $f_c$, with a pulse spacing determined by the period of the sampling modulation as illustrated in FIG. 2c. The other port of the multipactor 16 is terminated in a termination impedance 17 which dissipates the interpulse energy from the magnetron 12. The non-reflected signal from the multipactor 16 is then applied through a bandpass wave guide filter 19 to a duplexer 20 and then to an antenna 22 for illuminating a target. The filter 19 or spectrum truncator as is also referred to functions to reduce the spectrum of the transmitted signal as will be described hereinafter. Although the filter is illustrated as appearing between the multipactor 16 and the duplexer 20, it is contemplated that the same result (spectrum limiting) could be achieved by inserting a filter between the sampling modulator 18 and the multipactor 16 as illustrated by the dotted block. In this case, more conventional bandpass filters could be employed since microwave frequencies are not involved. The duplexer 20 may be a gas-discharge tube, a phase-shift wave guide, or a ferrite duplexer as described in *Introduction to Radar Systems*, by Merrill I. Skolnik, (1962) at pages 395 through 403.

To better understand how the aforementioned arrangement of elements produces an instantaneous frequency diversity signal, the following analytical discussion is presented.

Assume that the output of the magnetron 12 is defined by some function, $f_c(t)$, which may be of a sinusoidal nature such as $\cos \omega_x t$, where $\omega_x$ is the carrier frequency of the magnetron oscillator. Assume further that the modulating signal or gating signal from the modulator 14 is defined as follows:

$$g\tau(t) = U(t+\tau) - U(t-\tau)$$

where $U$ is a step of unitary amplitude between the limits of $-\tau < t < 0$ and $0 < t < \tau$, where $2\tau$ is the pulse width of the modulator 14 as illustrated in FIG. 4.

Since amplitude modulation of a carrier signal is mathematically defined as the product of the carrier signal and the modulating signal, the following expression is obtained:

$$f_c(t) \times g\tau(t) = [U(t=\tau) - U(t-\tau)] \cos \omega_x t$$

but, $f_c(t)$ has a transform given by $$F'[f_c(t)] = F'[\cos \omega_x t] = \pi[\delta(\omega - \omega_x) + \delta(\omega + \omega_x)]$$

and, $g\tau(t)$ has a transform given by $F'[g\tau(t)] = F'[U(t+\tau) - U(t-\tau)] = 2\tau \sin \omega\tau/\omega\tau$ then, since multiplication in the time domain corresponds to convolution in the frequency domain times $\frac{1}{2}\pi$, the output spectrum of the magnetron can be expressed as follows:

$$F_m(\omega) = F_\tau(\omega) * F_c(\omega)$$

$$F_m(\omega) = \frac{1}{2\pi} \int_{-\infty}^{\infty} \pi[\delta(U - \omega_x) + \delta(U + \omega_x)] \left[ 2\tau \frac{\sin(\omega - U)\tau}{(\omega - U)\tau} \right] dU$$

where
$F_m(\omega)$ = output spectrum from the magnetron, and
$U$ = dummy variable of integration after integration, $$F_m(\omega) = 2\tau[\sin(\omega - \omega_x)\tau]/(\omega - \omega_x)\tau$$

Now, sampling this spectrum at a rate determined by the sampling modulator 18, the expression for this sampling function in the time domain is as follows:

$$f_s(t) = \sum_{n=-\infty}^{\infty} \delta(\alpha - nT)$$

where:
$f_s(t)$ = sampling function in the time domain and
$T$ = period of the sampling modulator
Then, transforming this function to the frequency domain, there is obtained:

$$F_s(\omega) = \omega_o \sum_{n=-\infty}^{\infty} \delta(\omega - n\omega_o)$$

Where:
$F_s(\omega)$ = output spectrum of the sampling modulator, and
$\omega_o = 2\pi/T$ Again, multiplication in the time domain is convolution in the frequency domain times $\frac{1}{2}\pi$, therefore the output spectrum from the multipactor 16 is:

$$F_o(\omega) = F_m(\omega) * F_s(\omega)$$

$$= \frac{1}{2\pi} \int_{-\infty}^{\infty} 2\tau \omega_o \frac{\sin(\xi - \omega_x)\tau}{(\xi - \omega_x)\tau} \times \sum_{n=-\infty}^{\infty} \delta[(\omega - \xi) - n\omega_o] d\xi$$

where:
$F_o(\omega)$ = output spectrum from the multipactor, and
$\xi$ = dummy variable of integration
then, after integration:

$$F_o(\omega) = \sum_{n=-\infty}^{\infty} \frac{\omega_o \tau}{\pi} \frac{\sin(\omega - n\omega_o - \omega_x)\tau}{(\omega - n\omega_o - \omega_x)\tau}$$

which defines an instantaneous frequency spectrum of infinite bandwidth. Since, however, it is desired to operate only over a particular band, the broadband wave guide filter 19 (well known to those skilled in the art) centered about $\omega_x$ can be inserted between the multipactor 16 and the duplexer 20 for bandwidth limiting. If the filter 19 has a bandpass between selectively variable frequencies of $-k$ and $k$ then the instantaneous transmitted spectrum at the antenna is:

$$F_a(\omega) = \sum_{n=-k}^{k} \frac{\omega_o \tau}{\pi} \frac{\sin(\omega - n\omega_o - \omega_x)\tau}{(\omega - n\omega_o - \omega_x)\tau}$$

where:

$F_a(\omega)$ = instantaneous output spectrum of the transmitted signal, bandwidth limited.

Referring now to FIG. 3, there is illustrated a frequency spectrum of the transmitted signal, $F_a(\omega)$ with the horizontal axis being defined as $\omega$ and the vertical axis indicating the relative amplitudes of the Fourier components. As illustrated, each sin $x/x$ function is spaced from each other by an amount equal to $2\pi/t_o$ and the width of the function between the first zero crossings is equal to $4\pi/\alpha$. The number of spectral lines is a function of the pulse repetition rate of the radar system. Accordingly, the line spacing is equal to $2\pi/T$ with the amplitude of each line representing the relative amplitude of the particular harmonic.

Referring again to FIG. 1, echo returns are received through the antenna 22 and passed through the duplexer 20 to a traveling wave tube amplifier 24 where the echo returns are amplified and applied to a mixer 26 having a square law characteristic; that is, a signal applied at its input is multiplied by itself. This type conversion is referred to as auto correlation. To insure that the mixer is operating in the square law region, a bias voltage is provided from a bias supply 28. The output of the mixer 26 is a series of video pulses spaced from each other by an amount equal to the sampling rate of the transmitted signal. These video pulses are then applied to an IF amplifier and detector circuit 30 having an IF bandpass centered about the frequency of the return signals; that is, the frequency of the IF amplifier is the same as the repetition rate of the sampling modulator 18. If the sampling modulator is operating at a 5 megacycle rate, the return signals will also be at a 5 megacycle rate; accordingly, the IF amplifier will have a center frequency at 5 megacycles and a bandwidth sufficient to provide pulse to pulse integration. The output of the amplifier is then detected and applied to radar processing circuitry 32 from which target range information can be obtained.

In operation then, the magnetron 12 is pulsed at a particular system repetition rate, which for purposes of illustration may be for 2 microsecond intervals at a 2 kc. rate. The output of the magnetron is then applied to the multipactor 16 which samples the pulses RF signal at a rate determined by the sampling modulator 18. For example, if the sampling modulator is operating at a 5.0 megacycle repetition rate, the output of the multipactor 16 is then a series of pulse pickets having a pulse width equal to that of the sampling signal for a 2 microsecond duration. As a result of the carrier frequency gating and subsequent sampling by the multipactor, an amplitude modulated carrier frequency is produced which in the frequency domain represents an instantaneous frequency diversity signal.

Whereas echo signals from a complex target illuminated by the aforementioned signal have no common correlation (since the scattering cross section per unit area increases with increasing frequency), returns from a simple target will correlate and produce an output which will be readily discernible after integration and detection.

Consider, for example, that it is desired to locate a simple target in a complex environment. In such an environment, typical pulse radar systems employing either auto correlation or cross correlation techniques would receive large clutter return signals (produced by the wave motion) and hence the signal to clutter ratio would be very poor. Accordingly, the probability of detection would be considerably reduced. By illuminating the target with many frequencies simultaneously, however, the returns from random scatters will decorrelate instantaneously on a single pulse basis thereby improving the signal to clutter ratio and hence the probability of detection.

Accordingly, there is illustrated herein a technique for providing instantaneous frequency diversity signals for transmission to a target which in the presence of a clutter environment will provide signal to clutter enhancement in the received signal thereby increasing the probability of detection.

Obviously, many modifications and variations of the present invention are possible in light of the above teachings. It is therefore to be understood that, within the scope of the appended claims, the invention may be practiced otherwise than as specifically described.

What is claimed is:

1. An apparatus for generating instantaneous frequency diversity signals comprising:
   means providing pulse modulated signals; and
   means sampling said signals at selected intervals for providing output signals of instantaneous frequency diversity.

2. An apparatus as recited in claim 1 further comprising:
   means radiating said output signals to an object and receiving reflections therefrom; and
   means correlating said reflections and providing an output from which range information is obtained.

3. An apparatus as recited in claim 2 wherein said means sampling said signal comprises:
   sampling modulator means providing a control voltage; and
   a multipactor receiving said control voltage and passing said modulated signals only in the presence of said control voltage, whereby the output of said multipactor comprises pulse pickets having an instantaneous frequency diversity.

4. An apparatus as recited in claim 3 wherein said means sampling said signal further comprises:
   filter means connected to the output of said multipactor for limiting the bandwidth of said instantaneous frequency diversity signals.

5. An apparatus as recited in claim 3 wherein said sampling modulator means comprises:

a sampling modulator; and filter means connected to the output of said sampling modulator means for limiting the bandwidth of said control voltage.

6. An apparatus as recited in claim 3 wherein said means correlating said reflections comprises:
a mixer operating in a square law region for yielding the product of the received reflections with itself thereby providing a maximum value of an autocorrelation function;
means integrating the output signals from said mixer for providing an output from which range information is obtained.

7. An apparatus as recited in claim 3 wherein said means providing a pulse modulated signal comprises:
a magnetron;
means modulating said magnetron for providing said pulse modulated signals.

8. An apparatus as recited in claim 6 wherein said means integrating the output signals comprises:
an intermediate frequency amplifier having a bandpass characteristic centered about the repetition frequency of said sampling means for integrating the output signals from said mixer;
detector means receiving the integrated signal and providing a detected output having an amplitude proportional to the integrated signal from said amplifier; and
means processing said detected signal for determining object range information.

9. An apparatus as recited in claim 6 wherein said means radiating said output signals comprises:
a duplexer receiving said instantaneous frequency diversity signals; and
an antenna coupled to said duplexer for radiating said signals.

* * * * *